United States Patent
Vaz et al.

(10) Patent No.: US 9,102,332 B2
(45) Date of Patent: Aug. 11, 2015

(54) METHOD AND DEVICE FOR OPERATING A HYBRID DRIVE SYSTEM

(75) Inventors: Rocco Gonzalez Vaz, Stuttgart (DE); Klaus Schwarze, Duderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 684 days.

(21) Appl. No.: 13/135,840

(22) Filed: Jul. 15, 2011

(65) Prior Publication Data

US 2012/0022733 A1    Jan. 26, 2012

(30) Foreign Application Priority Data

Jul. 23, 2010   (DE) .................. 10 2010 038 351

(51) Int. Cl.
| | |
|---|---|
| B60W 50/00 | (2006.01) |
| B60W 10/06 | (2006.01) |
| B60W 10/08 | (2006.01) |
| B60W 20/00 | (2006.01) |

(52) U.S. Cl.
CPC .......... *B60W 50/0098* (2013.01); *B60W 10/06* (2013.01); *B60W 10/08* (2013.01); *B60W 20/00* (2013.01); *B60W 2050/0088* (2013.01); *B60W 2050/0096* (2013.01); *B60W 2530/18* (2013.01); *Y02T 10/6286* (2013.01)

(58) Field of Classification Search
CPC ..... B60W 20/00; B60W 10/08; B60W 10/06; B60W 50/0098; B60W 2050/0088; B60W 2050/0096; Y20T 10/6286; B60K 6/455
USPC ........... 701/36, 37, 22, 39, 43, 38, 42, 54, 48, 701/46, 58, 60, 62, 63, 65, 68, 69, 76, 79, 701/81, 84, 94, 99, 378
See application file for complete search history.

(56) References Cited

U.S. PATENT DOCUMENTS

| | | | | |
|---|---|---|---|---|
| 5,726,911 | A   * | 3/1998  | Canada et al. ................... 702/32 |
| 6,105,696 | A   * | 8/2000  | Chen ............................ 180/65.1 |
| 7,628,535 | B2 * | 12/2009 | Vaz et al. ....................... 374/102 |
| 8,424,294 | B2 * | 4/2013  | Schumacher et al. .......... 60/295 |
| 2010/0198437 | A1* | 8/2010 | Kettenacker et al. ........... 701/22 |
| 2011/0052203 | A1* | 3/2011 | Stumpf et al. ................. 398/140 |
| 2011/0071711 | A1* | 3/2011 | Sharp et al. ..................... 701/22 |
| 2011/0238932 | A1* | 9/2011 | Reimann et al. .............. 711/154 |
| 2012/0022733 | A1* | 1/2012 | Vaz et al. ........................ 701/22 |

OTHER PUBLICATIONS

"Claims for Examiner's Amendment—Approved by applicant Apr. 3, 2015"; Claims for Examiner's Amendment—Approved by applicant Apr. 3, 2015.pdf; authored by Claire Rollor.*

* cited by examiner

*Primary Examiner* — James Trammell
*Assistant Examiner* — James E Stroud
(74) *Attorney, Agent, or Firm* — Kenyon & Kenyon LLP

(57) ABSTRACT

In a method for operating a hybrid drive system having multiple drive units each having a drive motor and a motor control unit, the motor control units are activatable in order to request partial drive torques from the drive units according to a drive strategy. At least one of the motor control units is configured to execute an adaptation function when an adaptation function condition is present. The drive strategy is selected as a function of a frequency of an execution of the adaptation function in the motor control unit.

6 Claims, 2 Drawing Sheets

METHOD AND DEVICE FOR OPERATING A HYBRID DRIVE SYSTEM

BACKGROUND OF THE INVENTION

1. Field of the Invention

The present invention generally relates to a method and a device for operating a hybrid drive system having multiple drives, and relates particularly to the execution of learning functions in order to adapt regulation of the drives of the hybrid drive system to changed physical behavior of the drives.

2. Description of the Related Art

For previous drives having internal combustion engines, the internal combustion engines are activated by an appropriate engine control unit in order to provide the desired output variables such as rotational speed or torque, for example. Since the physical behavior of the internal combustion engine may change over time due to various influences, for example aging, temperature fluctuations, or the like, adaptation functions are usually implemented in the engine control unit. These adaptation functions may be triggered as a function of operating data, for example the operating time of the internal combustion engine, the distance traveled, the number of driving cycles, or the number of revolutions of the engine shaft, and as a function of a specified operating range of the internal combustion engine. If the specified operating range is operated for a minimum period of time which is necessary for completely executing the adaptation function, specific parameters may be adjusted or adapted with the aid of the adaptation function.

In hybrid drive systems, two or more than two types of drives are generally used in parallel. A higher-level hybrid control unit is used to select a subdivision of the torque to be provided, according to a drive strategy, as a function of the driver's specifications and as a function of the instantaneous operating states of the vehicle or of the drive system. Depending on the drive strategy provided, the operating control unit may provide that in the specific operating range of the motor vehicle and in specific ranges of driver specifications the load is distributed between the drives so that the drives are each operated in preferred operating ranges. However, this may result in certain operating ranges no longer being included in a drive, since the drive strategy which is implemented in the hybrid control unit keeps one or more of the drives in a preferred operating range.

In the example of the internal combustion engine as the drive, current drive strategies of the hybrid control units provide that the hybrid control units are operated in a medium load range so that, for example, operating modes such as coasting mode or idle speed occur rarely or not at all.

If this is the case, the engine control unit is no longer able to carry out the adaptation function, even when a suitable testing time is established, since the internal combustion engine no longer reaches the operating range which is necessary for executing the adaptation function.

An object of the present invention, therefore, is to provide a method and a device for operating a hybrid drive system via which, also for a hybrid drive system, it may be ensured that necessary adaptation functions for the individual drives are executed.

BRIEF SUMMARY OF THE INVENTION

According to a first aspect of the present invention, a method is provided for operating a hybrid drive system having multiple drive units, each having a drive motor and a motor control unit. The motor control units may be activated to request partial drive torques from the drive units according to a drive strategy, at least one of the motor control units being designed to carry out an adaptation function when an adaptation function condition is present. The drive strategy is selected as a function of a frequency of an execution of the adaptation function in the motor control unit.

A concept of the above method is that, for a hybrid drive system having multiple types of drives, each controlled by an associated motor control unit, at least one of the motor control units is activated as a function of a frequency, so that the associated drive motor is operated in an operating range in which an appropriate adaptation function may be executed. For example, a higher-level hybrid control unit, which in the normal operating case coordinates the partial drive torques of the drive units according to a drive strategy, may be informed of the need to execute the adaptation function in the motor control unit when the frequency of the execution of the adaptation function is too low.

The hybrid control unit is able to activate the motor control unit for the applicable drive motor in such a way that the drive motor is operated in an operating range in which the adaptation function may be executed. This has the advantage that, also in a hybrid drive system, the adaptation functions necessary for adapting parameters of the particular drive may be executed, even when the operating ranges necessary for this purpose would rarely or never be adopted during execution of the conventional drive strategy for the normal operating case.

The drive strategy may also be selected as a function of whether a frequency of an execution of the adaptation function in the motor control unit falls below a predefined frequency threshold value.

According to one specific embodiment, when the frequency of the execution of the adaptation function in the motor control unit falls below the predefined frequency threshold value, the partial drive torque may be selected in such a way that the motor control unit activates the drive motor in order to operate the same in an operating range which meets the adaptation function condition.

It may be provided that the frequency of the execution of the adaptation function relates to an overall operating time of the drive motor, to a previous distance traveled by the vehicle, to a number of overall driving cycles provided by switching the drive motor on and off, to a number of overall engine revolutions over the entire operating time, and the like.

According to another aspect, a hybrid drive system is provided having multiple drive units, each having a drive motor and a motor control unit. The motor control units may be activated to request partial drive torques from the drive units according to a specified drive strategy, at least one of the motor control units being designed to execute an adaptation function when an adaptation function condition is present. The at least one motor control unit has a function unit for communicating information, in particular externally or to a hybrid control unit, concerning a frequency of an execution of the adaptation function in the motor control unit.

According to another aspect, a motor system is provided having the above hybrid drive system and having a hybrid control unit. The hybrid control unit is designed to receive the information concerning the frequency of the execution of the adaptation function, and to select the drive strategy as a function of the received information concerning the frequency of the execution of the adaptation function.

According to one specific embodiment, the hybrid control unit may be designed to communicate information concerning partial drive torques to the drive units, corresponding to the selected drive strategy, so that one of the at least one motor control units operates the associated drive motor in an operating range which is necessary for executing the adaptation function.

According to another aspect, a computer program product is provided which contains a program code which, when executed on a data processing unit, carries out the above method.

DETAILED DESCRIPTION OF THE INVENTION

Figure 1:
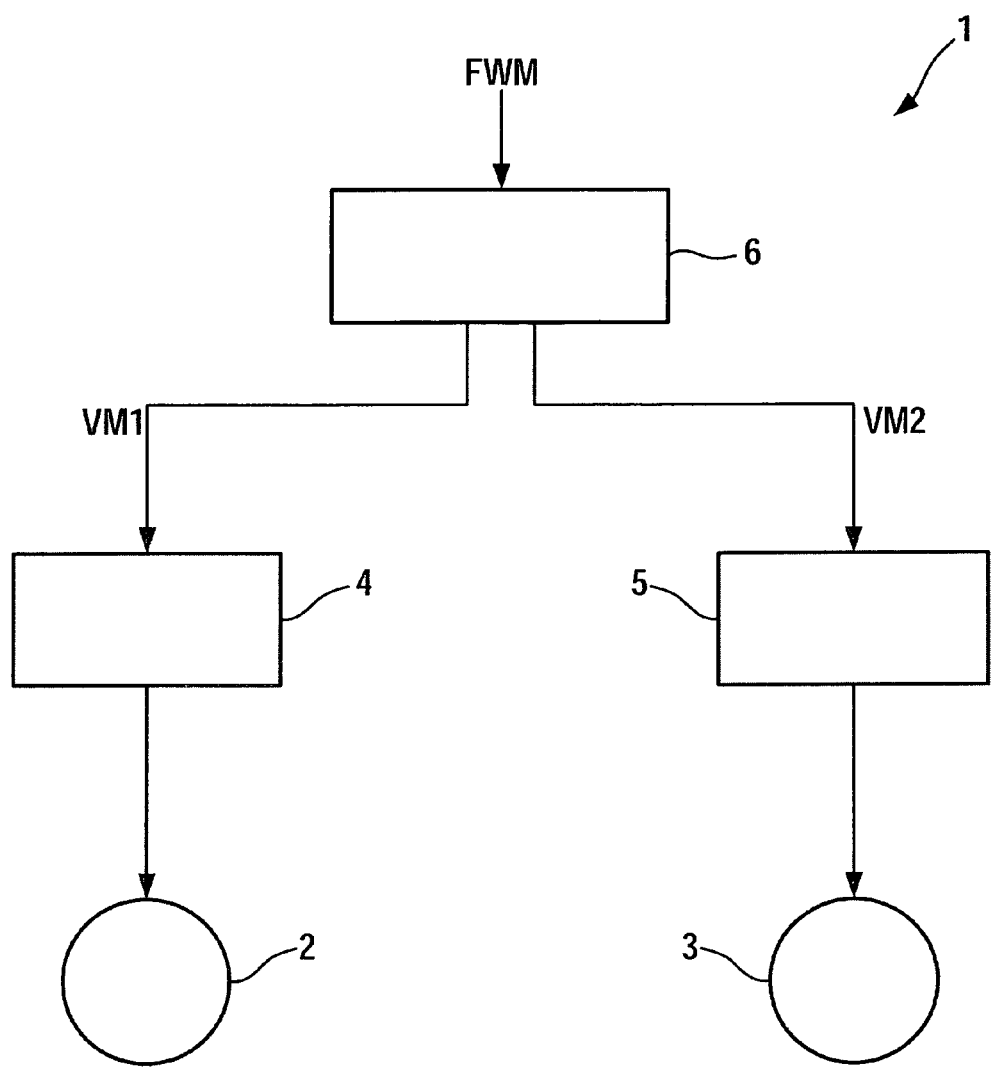
FIG. 1 shows a schematic illustration of a hybrid drive system for a motor vehicle.

FIG. 1 schematically shows a motor system 1, in particular for operating a motor vehicle. Motor system 1 corresponds to a hybrid drive system in which multiple types of drives are used. In the exemplary embodiment shown, the hybrid drive system includes two drive motors, for example an internal combustion engine 2 and an electric motor 3. Both drive motors are able to provide a torque as partial drive torque for operating the motor vehicle. The partial drive torques provided by drive motors 2, 3 cooperate in such a way that the partial drive torques are added together to form a total drive torque which is provided, for example, on a common drive shaft (not shown).

Internal combustion engine 2 is activated by an internal combustion engine control unit as a first motor control unit 4 according to a specified first specification torque VM1. Thus, first motor control unit 4 operates internal combustion engine 2 by adjusting position sensors, for example of a throttle valve, of intake valves and exhaust valves, of an ignition device, and the like, in order to provide first specification torque VM1 by internal combustion engine 2.

Similarly, electric motor 3 is activated by an electric motor control unit as second motor control unit 5 in order to provide a second specification torque VM2. First and second specification torques VM1, VM2 are ascertained by a hybrid control unit 6 as a function of a specified driver input torque FWM, which may be deduced, for example, from a position of an accelerator pedal of the motor vehicle, and as a function of a drive strategy.

The drive strategy determines the extent of driver input torque FWM to be provided which is to be provided by a cooperation of the two drive motors 2, 3. Typical drive strategies provide for operation of internal combustion engine 2 in an operating range which is optimal for fuel consumption and emissions in order to reduce the fuel consumption and the emissions. Such drive strategies may also provide for taking into account the availability of fuel in a fuel tank, or of electrical power in an energy storage.

The particular motor control units 4, 5 may provide so-called adaptation functions, in which one or multiple parameters for operating the particular drive motor 2, 3 may be adjusted or adapted, in order to take into account physical effects which result in a behavior of the particular drive motor 2, 3 which changes over time. For example, such effects may be aging effects which cause wear and/or changes in material properties.

In an internal combustion engine 2, an adaptation function may be, for example, a calibration of a measured value of a sensor, for example the hot film air mass sensor in an air feed system of the internal combustion engine, or an adjustment of the positioning characteristics of a position sensor, for example the throttle valve position sensor for adjusting a position of a throttle valve in the air feed system of the internal combustion engine.

Second motor control unit 5 for electric motor 3 may also carry out one or multiple such adaptation functions. For example, the temperature of a motor winding of electric motor 3 is often estimated based on the dynamic behavior, for example during a jump in an activation voltage. The parameters on which the estimation is based may be adapted for certain operating points, for example freewheeling or the like, in order to compensate for deviations of the estimated winding temperature from the actual winding temperature, which occur in the measuring electronics system, for example, due to aging.

Figure 2:
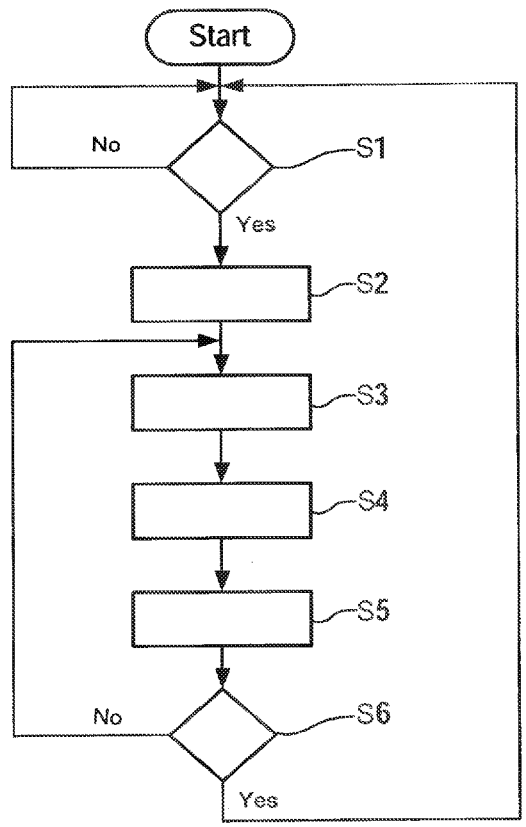
FIG. 2 shows a flow chart for illustrating the method for operating the hybrid drive system.

FIG. 2 shows a flow chart for illustrating a method for operating hybrid drive system 1. The method concerns the communication between hybrid control unit 6 and first motor control unit 4, but may be carried out for any of motor control units 4, 5. The starting point for the described method is a normal operating state in which hybrid control unit 6 activates motor control units 4, 5 according to a first drive strategy in such a way that a specified driver input torque FWM is subdivided into two partial drive torques which are provided by internal combustion engine 2 and electric motor 3, and which together result in driver input torque FWM.

In step S1 a query is made as to whether an adaptation function frequency for the internal combustion engine is below a predefined applicable frequency threshold value. The adaptation function frequency indicates a frequency with which an adaptation function is executed. This frequency may be, for example, an overall operating time of the applicable drive motor such as internal combustion engine 2, for example, a previous distance traveled by the vehicle, the number of overall driving cycles provided by switching the drive motor on and off, the number of overall engine revolutions over the entire operating time, and the like. In general, a frequency threshold value may be defined for any adaptation function.

Only when the adaptation function frequency does not exceed the frequency threshold value (alternative: yes) is this communicated to hybrid control unit 6 in a step S2, for example with the aid of an adaptation function request signal LAS.

Upon receipt of adaptation function request signal LAS, which indicates that the adaptation function frequency has not reached the frequency threshold value or falls below same, the subdivision of specified driver input torque FWM into the partial drive torques is changed in hybrid control unit 6 in step S3 according to the first drive strategy by replacing the first drive strategy with an adaptation function mode.

In the adaptation function mode, an adaptation function which is associated with the applicable frequency threshold value is initiated in first motor control unit 4, in that first motor control unit 4 is assigned a partial drive torque which results in an operation of internal combustion engine 2 within an operating range in which the adaptation function associated with the frequency threshold value may be executed. Thus, in first motor control unit 4 on the one hand the met condition is present that the adaptation function frequency does not exceed a frequency threshold value, and on the other hand, that internal combustion engine 2 is operated in the operating range which is necessary for triggering the adaptation function, for example an operating range in coasting mode or idle speed. When these conditions are identified, first motor control unit 4 activates the adaptation function for a required period of time in step S4.

To prevent hybrid control unit 6 from prematurely changing the request for the partial drive torque for applicable first motor control unit 4, i.e., before the adaptation function has been completely executed, first motor control unit 4 signals adaption status information to hybrid control unit 6 until the adaptation function has been completely executed.

When hybrid control unit 6 is in the adaptation function mode, first motor control unit 4, which is to execute the adaptation function, is provided with the information concerning the partial drive torque which is necessary for executing the adaptation function. At the same time, in step S5 second motor control unit 5 is provided with information concerning a partial drive torque which, in steady-state operation, essentially corresponds to the difference between requested driver input torque FWM and the partial drive torque which is necessary for executing the adaptation function. In this way, the adaptation function may be executed in first motor control unit 4 without a change in the total drive torque provided by motor system 1.

In step S6 a check is made as to whether the period of time necessary for executing the adaptation function has already elapsed. If this is the case, the program jumps back to step S1, the process is restarted, and it is waited for the adaptation function frequency to reach or fall below the frequency threshold value. Otherwise (alternative: no), the program jumps to step S3 so that the adaptation process may be continued.

Figure 3:
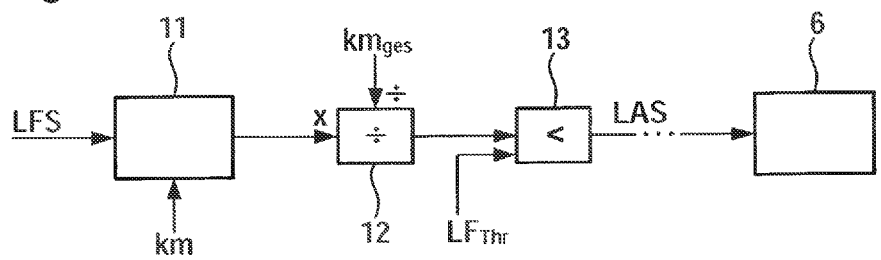
FIG. 3 shows a block diagram for illustrating the function for signaling an excessively low frequency of the execution of an adaptation function in a motor control unit for a drive unit.

FIG. 3 shows a schematic illustration of a function unit for generating adaptation function request signal LAS by first motor control unit 4. A counter 11 is implemented in first motor control unit 4 which counts or does not count as a function of a state of an adaptation function signal LFS. Adaptation function signal LFS has a first level in which counter 11 is activated when an adaptation function is executed in first motor control unit 4, and has a second level in which counter 11 is deactivated when the adaptation function is not executed in first motor control unit 4.

In the activated state, counter 11 counts an adaptation function frequency, for example in the exemplary embodiment shown, the kilometers km traveled by the motor vehicle while first motor control unit 4 is in the adaptation function mode. Thus, counter 11 indicates the distance over which the conditions for executing the adaptation function in applicable first motor control unit 4 have been present.

The counter value is divided by the number of total driven kilometers $km_{ges}$ in a divider element 12. The result of the division indicates the adaptation function frequency with which the adaptation function has been executed.

The result of the division is compared to a predefined frequency threshold value $LF_{THR}$ in a comparator 13. If the result of the division falls below frequency threshold value $LF_{THR}$, this means that the conditions for executing the adaptation function have not been present often enough in first motor control unit 4. Thus, the adaptation function has not been executed frequently enough. The result of the comparison may then be provided to hybrid control unit 6 as adaptation function request signal LAS, and the hybrid control unit then appropriately leaves the drive strategy and goes into the adaptation function mode by activating applicable motor control unit 4 according to a partial drive torque in such a way that internal combustion engine 2 is operated within the operating range for executing the applicable learning function. It may thus be ensured that these adaptation functions may still be periodically executed, even when the hybrid drive system is operated according to a drive strategy which tends to avoid operating states in which certain learning functions are executed.

Multiple such counters 11 which are associated with various adaptation functions in first motor control unit 4 may be provided in hybrid control unit 6. Besides counting the driven kilometers of the covered distance, counter 11 may also count the operating time of the drive motor, the number of driving cycles, the number of engine revolutions, and the like, depending on how the condition is defined for which the applicable adaptation function is to be executed.

What is claimed is:

1. A method for operating a hybrid drive system having multiple drive units, each drive unit having a drive motor and a motor control unit, comprising:
   activating at least one of the motor control units in order to request a partial drive torque from at least one of the drive units according to a drive strategy;
   executing by at least one of the motor control units an adaptation function when a predefined condition is present for the adaptation function;
   determining a frequency of an execution of the adaptation function; and
   determining whether the determined frequency of the execution of the adaptation function falls below a predefined frequency threshold value,
   wherein the drive strategy is selected as a function of whether the frequency of the execution of the adaptation function in the at least one motor control unit falls below the predefined frequency threshold value, and
   wherein the drive strategy is selected as a function of the determined frequency of the execution of the adaptation function in the at least one motor control unit.

2. The method as recited in claim 1, wherein, when the frequency of the execution of the adaptation function in the at least one motor control unit falls below the predefined frequency threshold value, the partial drive torque is selected in such a way that the at least one motor control unit activates at least one drive motor to operate in an operating range which meets the predefined condition for the adaptation function.

3. The method as recited in claim 1, wherein the frequency of the execution of the adaptation function relates to at least one of an overall operating time of the drive motor, previous distance traveled by the vehicle, a number of overall driving cycles provided by switching at least one drive motor on and off, and a number of overall engine revolutions over a predefined operating time.

4. A hybrid drive system, comprising: at least two drive units, each drive unit having a drive motor and a motor control unit, the motor control units being configured to be activated in order to request partial drive torques from the drive units according to a specified drive strategy; wherein at least one of the motor control units is configured to execute an adaptation function when a predefined condition for the adaptation function is present, and wherein the at least one of the motor control units has a function unit for determining a frequency of an execution of the adaptation function, for determining whether the determined frequency of the execution of the adaptation functions falls below a predefined frequency threshold value, and for communicating information, one of externally or to a hybrid control unit, regarding the determined frequency of the execution of the adaptation function in the at least one motor control unit, wherein the hybrid control unit is configured to i) receive the information concerning the determined frequency of the execution of the adaptation function and whether the determined frequency of the execution of the adaptation function falls below the predefined frequency threshold value, and ii) select the drive strategy as a function of the received information concerning the determined frequency of the execution of the adaptation function and whether the frequency of the execution of the adaptation function in the at least one motor control unit falls below the predefined frequency threshold value.

5. The hybrid drive system as recited in claim 4, wherein the hybrid control unit is configured to communicate information concerning partial drive torques corresponding to the selected drive strategy to the drive units such that the at least one of the motor control units operates an associated drive motor in an operating range necessary for executing the adaptation function.

6. A non-transitory computer-readable data storage medium storing a computer program having program codes which, when executed on a computer, performs a method for operating a hybrid drive system having multiple drive units, each drive unit having a drive motor and a motor control unit, the method comprising: activating at least one of the motor control units in order to request a partial drive torque from at least one of the drive units according to a drive strategy; executing by at least one of the motor control units an adaptation function when a predefined condition is present for the adaptation function; determining a frequency of an execution of the adaptation function; and determining whether the determined frequency of the execution of the adaptation function falls below a predefined frequency threshold value, wherein the drive strategy is selected as a function of whether the frequency of the execution of the adaptation function in the at least one motor control unit falls below the predefined frequency threshold value, and wherein the drive strategy is selected as a function of the determined frequency of the execution of the adaptation function in the at least one motor control unit.

* * * * *